US006977829B2

(12) United States Patent
Huang

(10) Patent No.: US 6,977,829 B2
(45) Date of Patent: Dec. 20, 2005

(54) CURRENT DISTRIBUTION CIRCUIT

(75) Inventor: Chih-Hsiung Huang, Taoyuan Shien (TW)

(73) Assignee: Delta Electronics. Inc., Taoyuan (TW)

( * ) Notice: Subject to any disclaimer, the term of this patent is extended or adjusted under 35 U.S.C. 154(b) by 0 days.

(21) Appl. No.: 10/983,530

(22) Filed: Nov. 8, 2004

(65) Prior Publication Data

US 2005/0141249 A1 Jun. 30, 2005

(30) Foreign Application Priority Data

Dec. 30, 2003 (TW) .............................. 92137537 A
Jan. 12, 2004 (TW) .............................. 93100718 A

(51) Int. Cl.[7] ................................................ H02M 7/00
(52) U.S. Cl. ........................................................ 363/72
(58) Field of Search ............................. 363/65, 71, 72; 307/82

(56) References Cited

U.S. PATENT DOCUMENTS 5,157,269 A * 10/1992 Jordan et al. ................. 307/59
5,193,054 A * 3/1993 Galloway et al. ............. 363/72
5,521,809 A * 5/1996 Ashley et al. ................ 363/71
5,740,023 A * 4/1998 Brooke et al. ................ 363/65
5,995,390 A * 11/1999 Otake .......................... 363/39
6,483,729 B2 * 11/2002 Messager ...................... 363/72
6,690,589 B2 * 2/2004 Barnett et al. ................ 363/72

* cited by examiner

*Primary Examiner*—Adolf Berhane

(74) *Attorney, Agent, or Firm*—Volpe and Koenig, P.C.

(57) ABSTRACT

A master-slave current distribution circuit for parallel power supplies is disclosed. The master-slave current distribution circuit for parallel power supplies comprising at least a first power supply and a second power supply includes a voltage amplifier, a power converting unit, a current detecting unit, an equivalent diode, an adjustable amplifier, an adding unit, and an energy gap voltage modulating unit, wherein an energy gap voltage formed between the output of the current detecting unit and the non-inverting input of the adjustable amplifier is modulated by the energy gap voltage modulating unit so that an unstability formed from the first power supply and the second power supply under a light load is eliminated.

19 Claims, 12 Drawing Sheets

CURRENT DISTRIBUTION CIRCUIT

FIELD OF THE INVENTION

This invention relates to a current distribution circuit for the parallel power supply, and more particularly to a current distribution circuit for providing a stable situation in applying in the parallel power supplies.

BACKGROUND OF THE INVENTION

Please refer to FIG. 1(*a*), which is a diagram illustrating a conventional master-slave current distribution circuit applying in the parallel power supply, wherein the master-slave current distribution circuit 1 includes a voltage amplifier 11, an impedor 12, a power converting unit 13, a current detecting unit 14, an equivalent diode 15, an adjustable amplifier 16 and an adding unit 17. When the master-slave current distribution circuit 1 is electrically connected to the parallel power supply including the power supplies PS1 and PS2, the object of the stable distribution of the output voltages and output currents thereof is achieved by the master-slave current distribution circuit 1.

An energy gap voltage is needed to be applied to the master-slave current distribution circuit 1 for preventing a parallel error which would result in an unstable output voltages therefrom. The parallel error in the master-slave current distribution circuit 1 is generated between the power supplies PS1 and PS2. For example, the equivalent diode 15, which is a discrete component in the master-slave current distribution circuit 1, will generate an non-linear voltage in the linear operation range (around 0~0.4V). The non-linear voltage generated by the equivalent diode 15 induces a parallel error in the master-slave current distribution circuit 1. Therefore, the parallel error problems would be solved when the energy gap voltage is applied to the master-slave current distribution circuit 1. But if the energy gap voltage is high, the unstable phenomenon in the output voltage of the power supplies PS1 and PS2 would be induced. In other words, the parallel error in the master-slave current distribution circuit 1 is induced by the high energy gap voltage.

For overcoming the mentioned drawbacks, the Application Specific Integrated Circuit (ASIC) is applied in a conventional master-slave current distribution circuit to decrease the operation voltage of the discrete component therein. The adopted energy gap voltage is hence to be kept in a low voltage range. However, the requirement of the energy gap voltages for different parallel power supplies are different, so as in the requirement of the energy gap voltages for different integrated circuits. Therefore, the result in using ASIC to decrease the energy gap voltage is limited as shown in FIG. 1(*b*). Accordingly, the present invention provides an improved master-slave current distribution circuit to overcome the drawbacks in the prior art.

SUMMARY OF THE INVENTION

In accordance with an aspect of the present invention, a current distribution circuit for parallel power supplies is provided, wherein the parallel power supply has at least a first power supply and a second power supply.

Preferably, the current distribution circuit includes a voltage amplifier, a power converting unit having an input electrically connected to an output of the voltage amplifier, and having an output electrically connected to a load, a current detecting unit having an input electrically connected to the output of the power converting unit and the load, an equivalent diode having an input electrically connected to an output of the current detecting unit, and having an output electrically connected to the parallel power supplies, an adjustable amplifier having an inverting input electrically connected to the output of the current detecting unit and the input of the equivalent diode, and having a non-inverting input electrically connected to the output of the equivalent diode and the parallel connecting power supplies, an adding unit electrically connected to a non-inverting input of the voltage amplifier and an output of the adjustable amplifier, and an energy gap voltage modulating unit electrically connected between the output of the current detecting unit and the non-inverting input of the adjustable amplifier. An energy gap voltage formed between the output of the current detecting unit and the non-inverting input of the adjustable amplifier thereby is modulated by the energy gap voltage modulating unit so that an unstability formed from the first power supply and the second power supply under a light load is eliminated.

Preferably, the current distribution circuit is a master-slave circuit.

Preferably, the voltage amplifier includes a negative feedback circuit.

Preferably, the negative feedback circuit includes an impedor.

Preferably, the energy gap voltage is raised by the energy gap voltage modulating unit when a first value of the load is less than a predetermined value, and is lowered thereby when a second value of the load is more than the predetermined value.

Preferably, the output of the current detecting unit is electrically connected to an active droop unit.

Preferably, a reference value of an operating voltage of the current distribution circuit is linearly adjusted by the active droop unit when a value of the load is less than the predetermined value so as to eliminate an error, which is formed when the first power supply is electrically connected to the second power supply in parallel.

Preferably, the reference value of the operating voltage is 1%~5% of an output voltage of the current distribution circuit.

Preferably, the voltage amplifier and the adjustable amplifier are electrically connected to a soft-start circuit.

Preferably, an output voltage from the current distribution circuit to the load is fed back to the soft-start circuit, so that the soft-start circuit is driven and has a voltage, and when a value of the voltage is equal to a proportional value of the output voltage, a surge voltage of the output voltage is lowered.

Preferably, the proportional value is 90%~95% of the output voltage.

In accordance with another aspect of the present invention, a current distribution circuit for parallel power supplies is provided, wherein the parallel power supply has at least a first power supply and a second power supply.

Perfectly, the current distribution circuit includes a power converting unit having an output electrically connected to a load, a current detecting unit having an input electrically connected to the output of the power converting unit and the load, an equivalent diode having an input electrically connected to an output of the current detecting unit, and having an output electrically connected to the parallel power supplies, an adjustable amplifier having an inverting input electrically connected to the output of the current detecting unit and the input of the equivalent diode, and having a non-inverting input electrically connected to the output of the equivalent diode and the parallel connecting power supplies, and an energy gap voltage modulating unit electrically connected between the output of the current detecting unit and the non-inverting input of the adjustable amplifier. An energy gap voltage formed between the output of the current detecting unit and the non-inverting input of the adjustable amplifier is modulated thereby so that an unstability formed from the first power supply and the second power supply under a light load is eliminated.

Preferably, the current distribution circuit is a master-slave circuit.

Preferably, the energy gap voltage is raised by the energy gap voltage modulating unit when a first value of the load is less than a predetermined value, and is lowered thereby when a second value of the load is more than the predetermined value.

Preferably, the output of the current detecting unit is electrically connected to an active droop unit.

Preferably, a reference value of an operating voltage of the current distribution circuit is linearly adjusted by the active droop unit when a value of the load is less than the predetermined value in order to eliminate an error, which is formed when the first power supply is electrically connected to the second power supply in parallel.

Preferably, a reference value of the operating voltage is 1%~5% of an output voltage of the current distribution circuit.

In accordance with another aspect of the present invention, a current distribution circuit for parallel power supplies is provided, wherein the parallel power supplies comprise at least a first power supply and a second power supply.

Perfectly, the current distribution circuit includes a current detecting unit electrically connected to a load, an adjustable amplifier having an inverting input electrically connected to an output of the current detecting unit and the parallel connecting power supplies, and an energy gap voltage modulating unit electrically connected between the output of the current detecting unit and an non-inverting input of the adjustable amplifier, wherein an energy gap voltage formed between the output of the current detecting unit and the non-inverting input of the adjustable amplifier is modulated thereby so that an unstability formed from the first power supply and the second power supply under a light load is eliminated.

Preferably, the current distribution circuit is a master-slave circuit.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 1(*b*) is a graph illustrating the relationship between the single output current and the total output current from the master-slave current distribution circuit in FIG. 1(*a*);

FIG. 2(*b*) is a graph illustrating the relationship between the compensation voltage and the gap voltage modulation from the master-slave current distribution circuit in FIG. 2(*a*);

FIG. 2(*c*) is a graph illustrating the relationship between the single output current and the total output current from the master-slave current distribution circuit in FIG. 2(*a*);

FIG. 3(*b*) is a graph illustrating the active voltage modulation detected from the master-slave current distribution circuit in FIG. 3(*a*);

FIG. 3(*c*) is a graph illustrating the relationship between the single output current and the total output current detected from the master-slave current distribution circuit in FIG. 3(*a*);

FIG. 3(*d*) is a graph illustrating a soft-start in the master-slave current distribution circuit in FIG. 3(*a*);

FIG. 3(*e*) is a graph illustrating the surge of the master-slave current distribution circuit in FIG. 1(*a*);

FIG. 3(*f*) is a graph illustrating the waveform of the voltage in the soft-start circuit according to another prior art.

DETAILED DESCRIPTION OF THE PREFERRED EMBODIMENT

The invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1A:
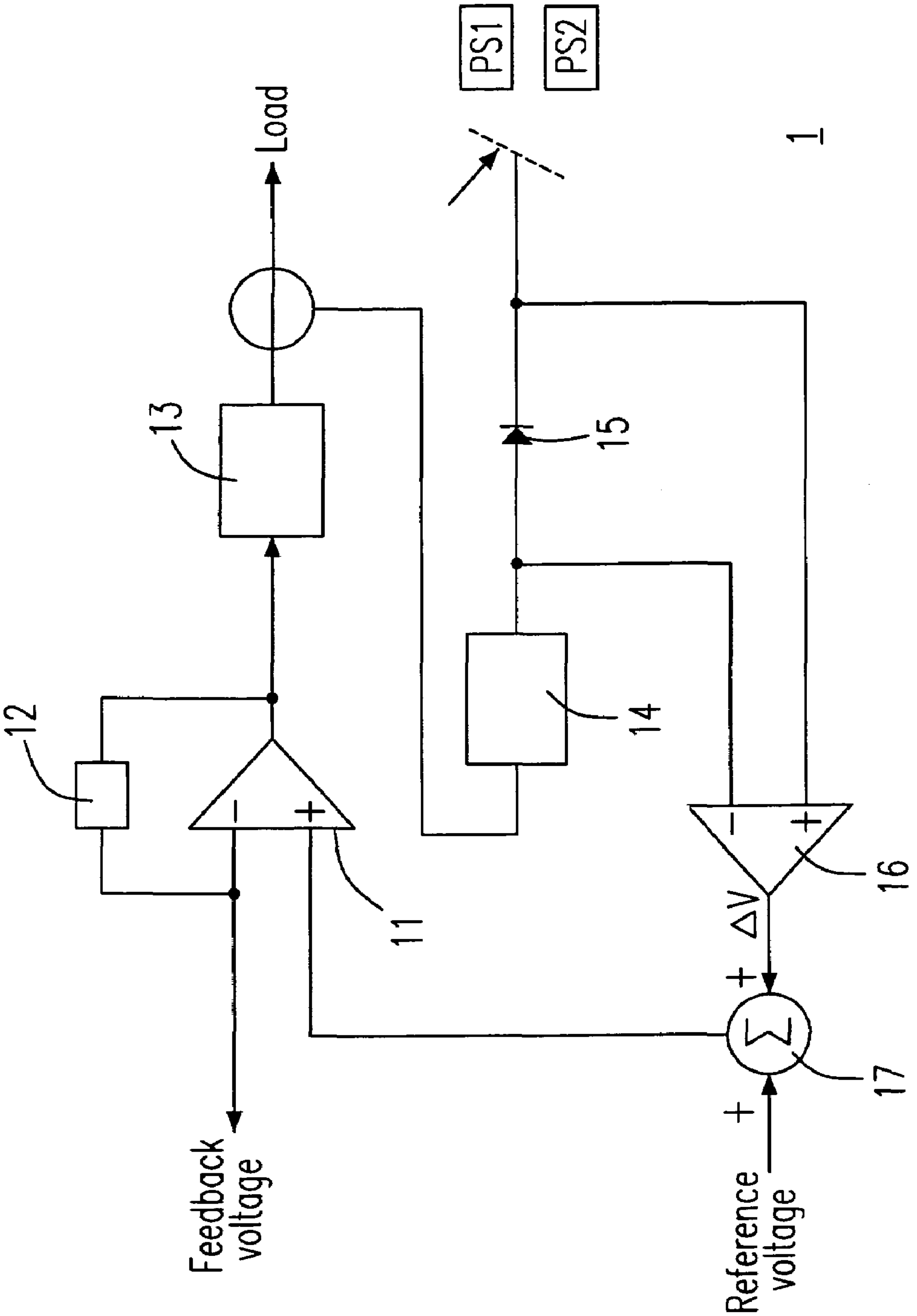
Fig. 1(a)(PRIOR ART)
FIG. 1(*a*) is a diagram illustrating a conventional master-slave current distribution circuit for parallel power supplies according to the prior art.
Figure 1B:
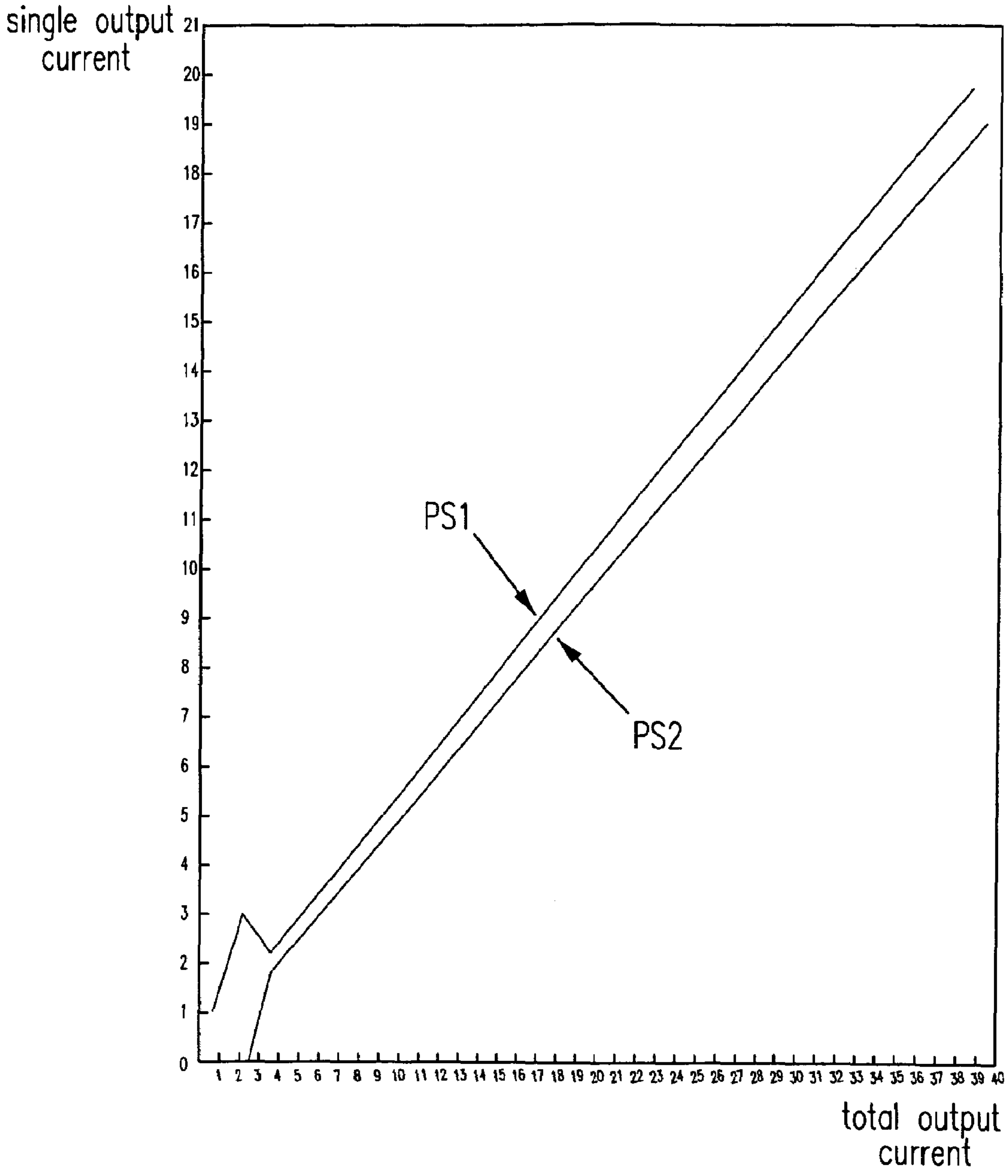
Fig. 1(b)(PRIOR ART)
Figure 2A:
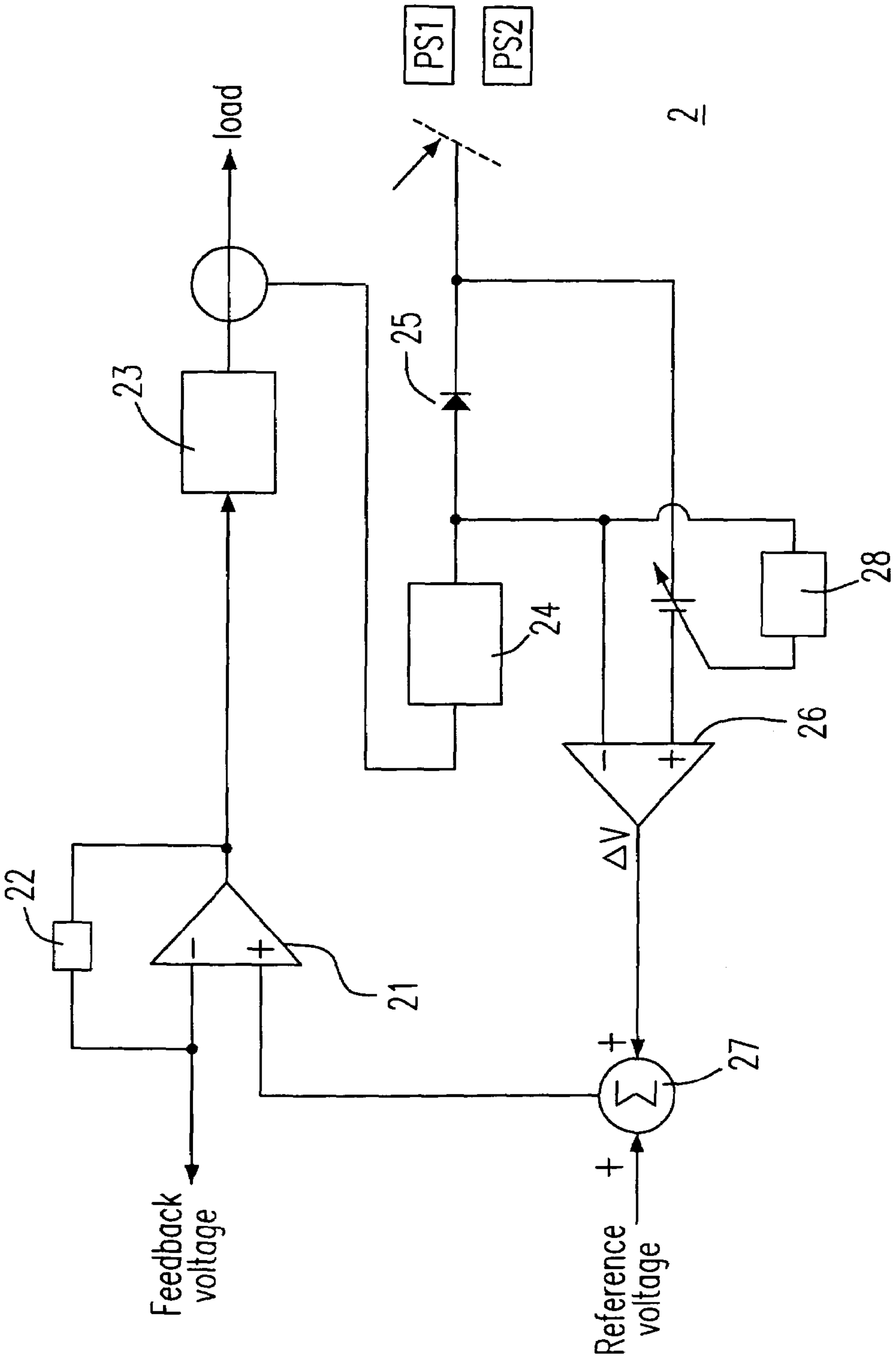
FIG. 2(*a*) is a diagram illustrating a master-slave current distribution circuit for parallel power supplies according to a preferred embodiment of the present invention.
Figure 2B:
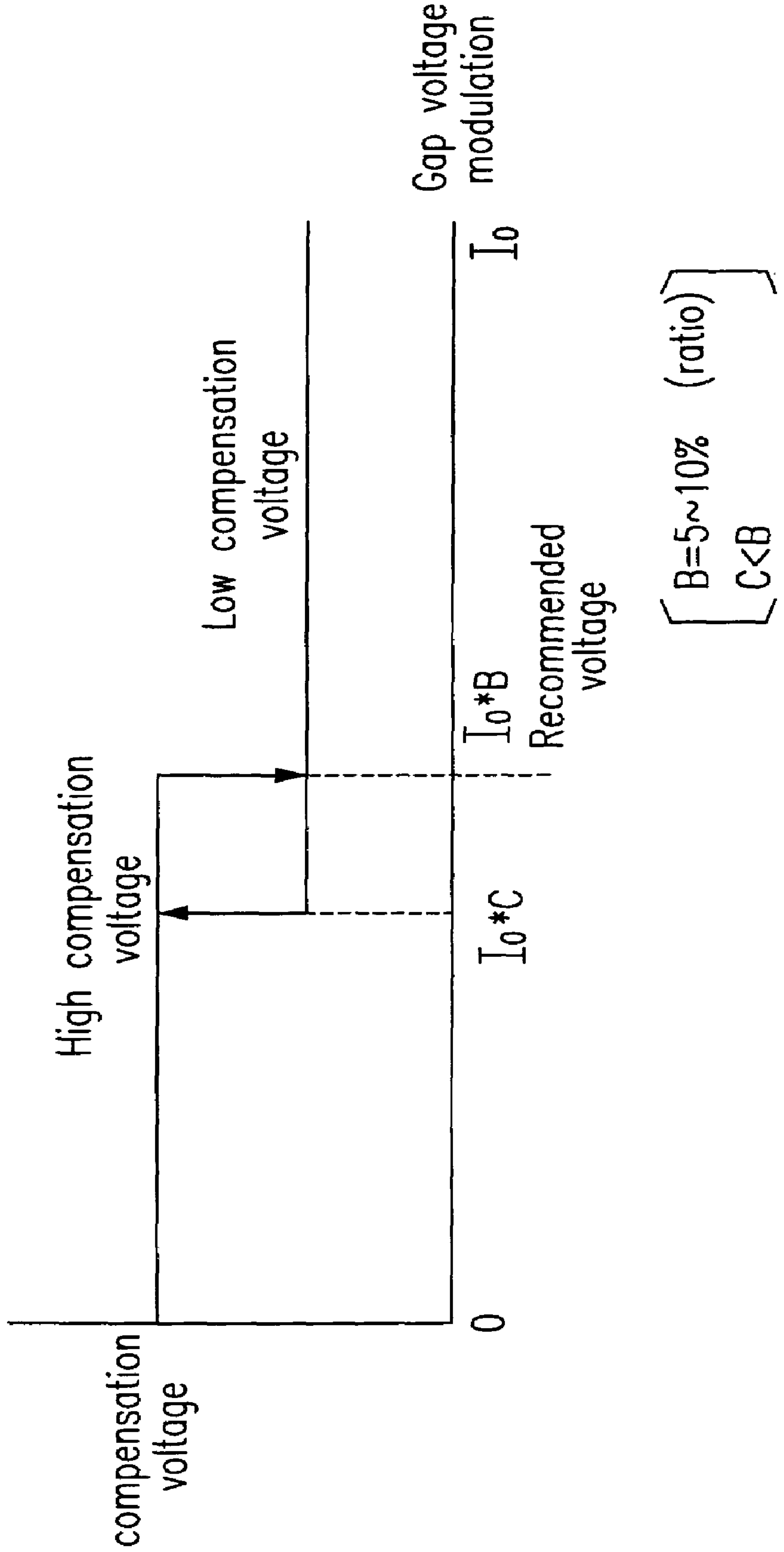
Figure 2C:
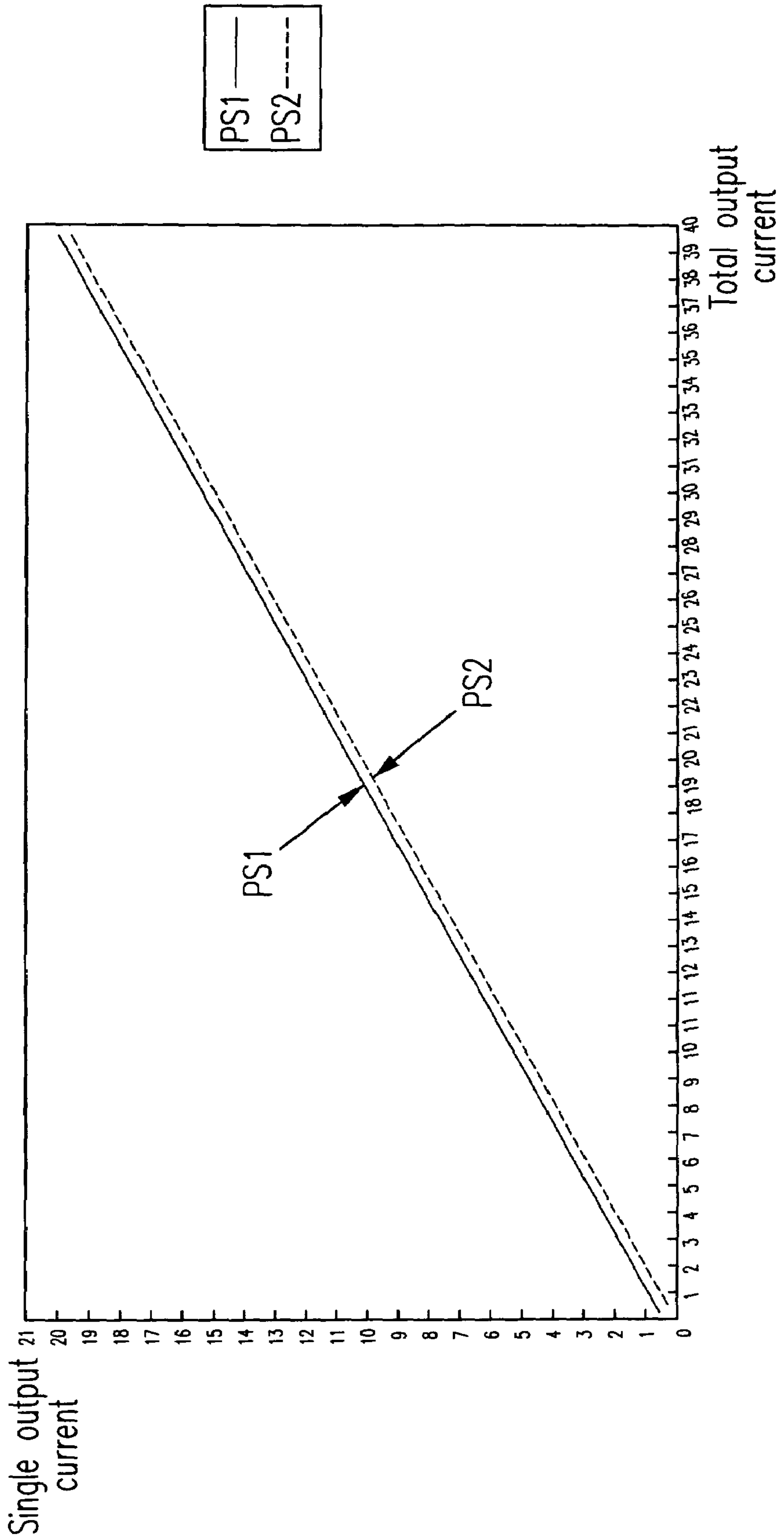
Figure 3A:
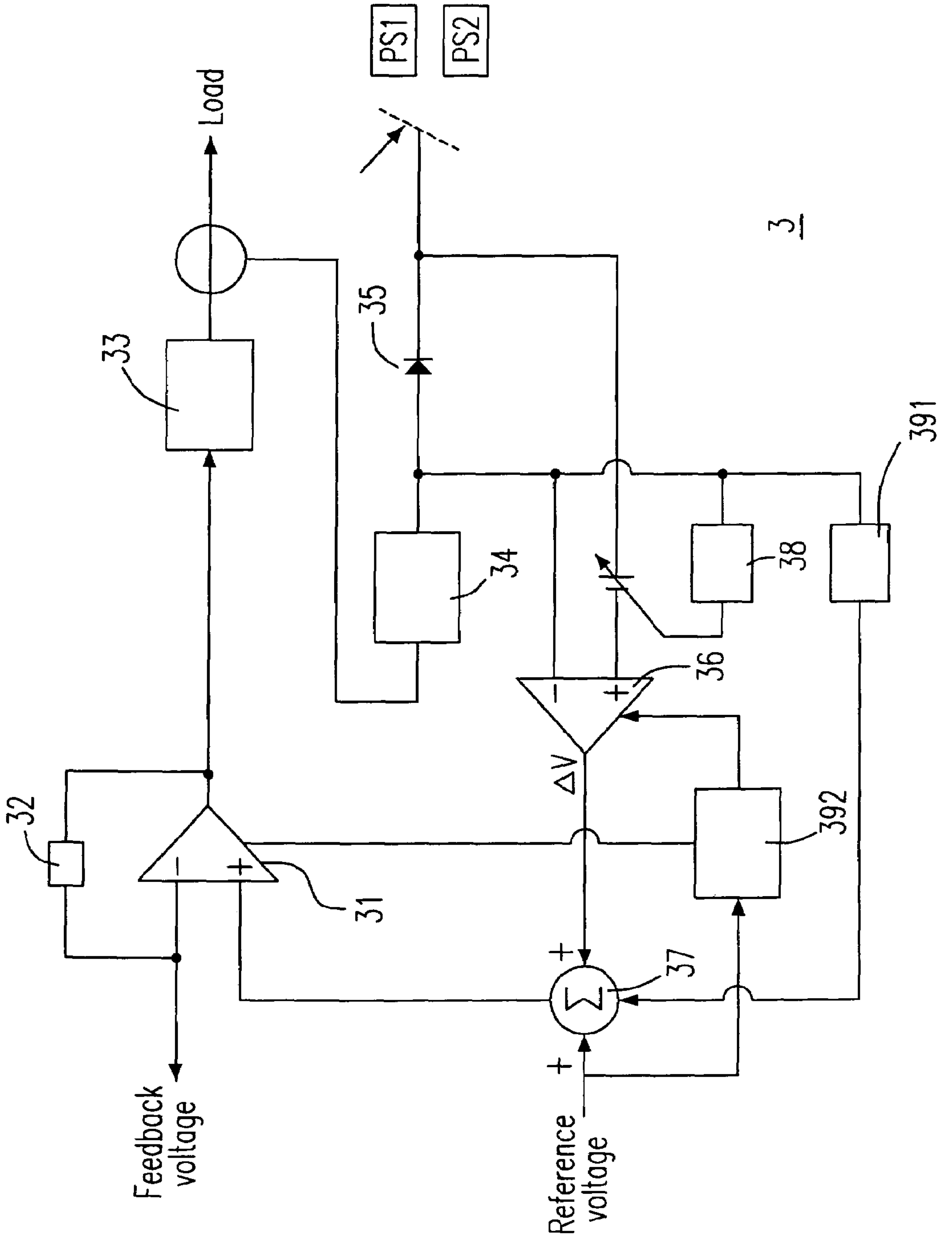
FIG. 3(*a*) is a diagram illustrating a master-slave current distribution circuit for parallel power supplies according to another preferred embodiment of the present invention.
Figure 3B:
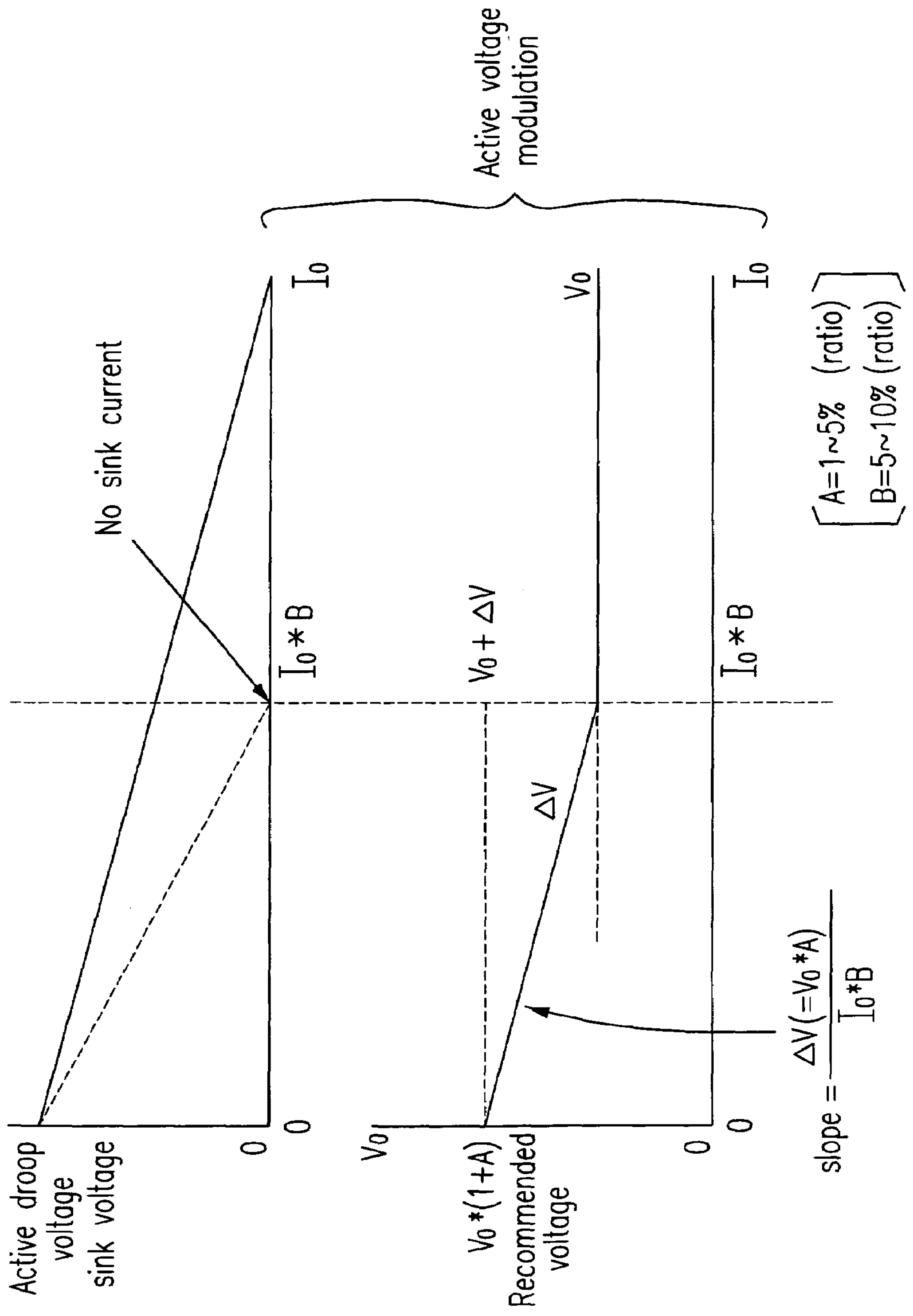
Figure 3C:
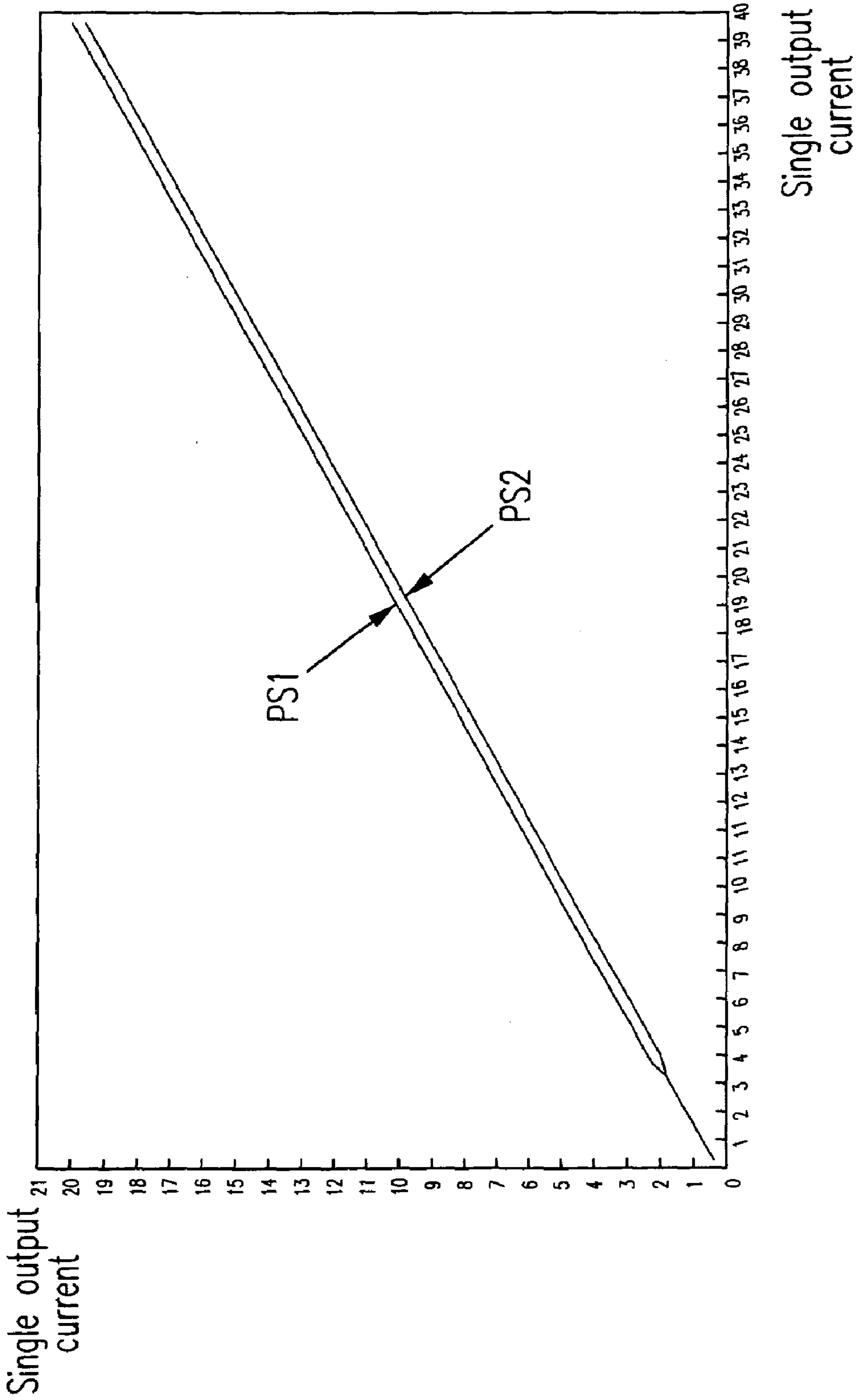
Figure 3D:
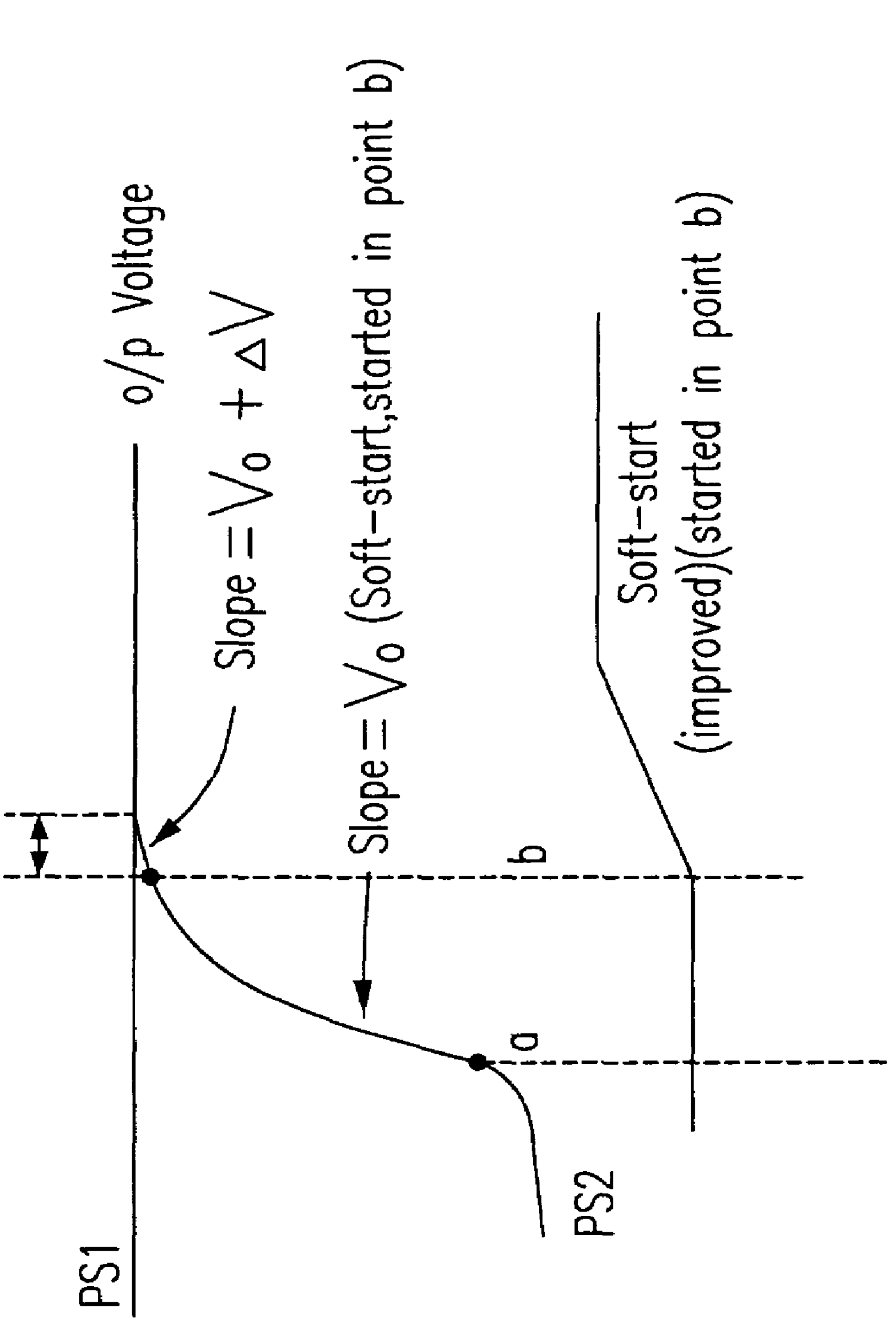
Figure 3E:
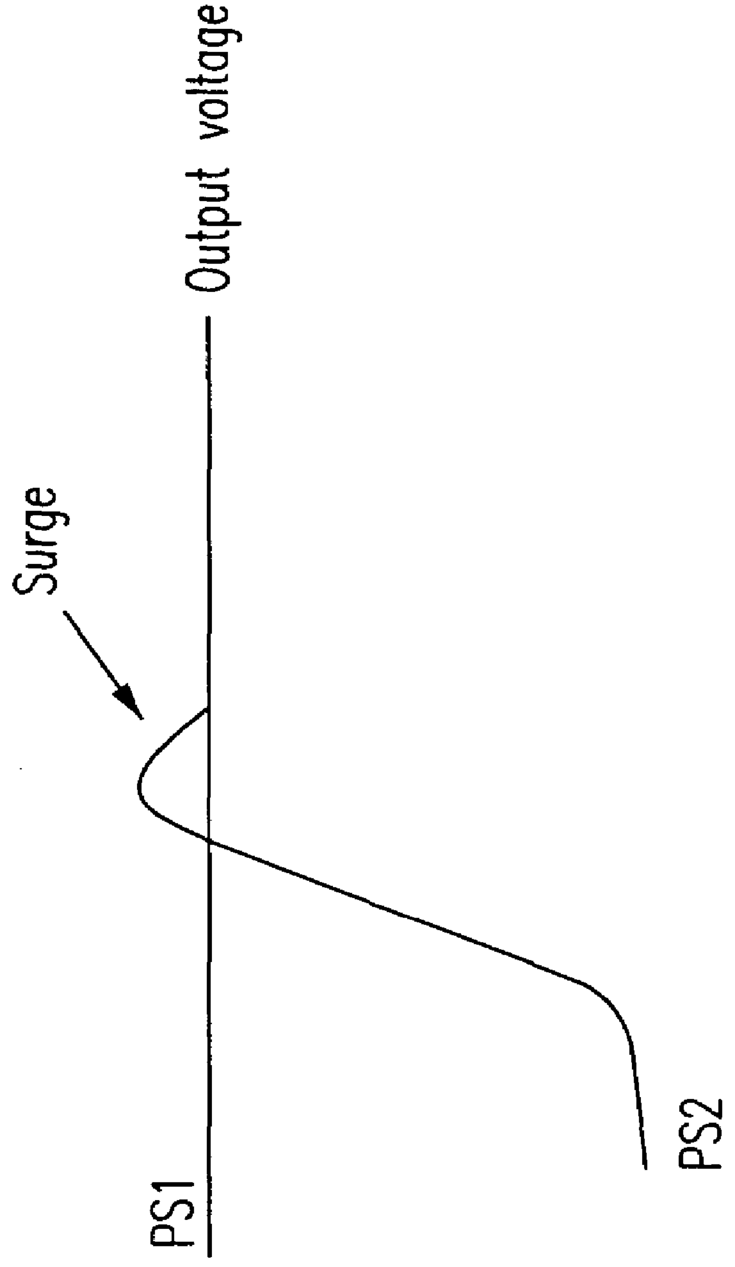
Figure 3F:
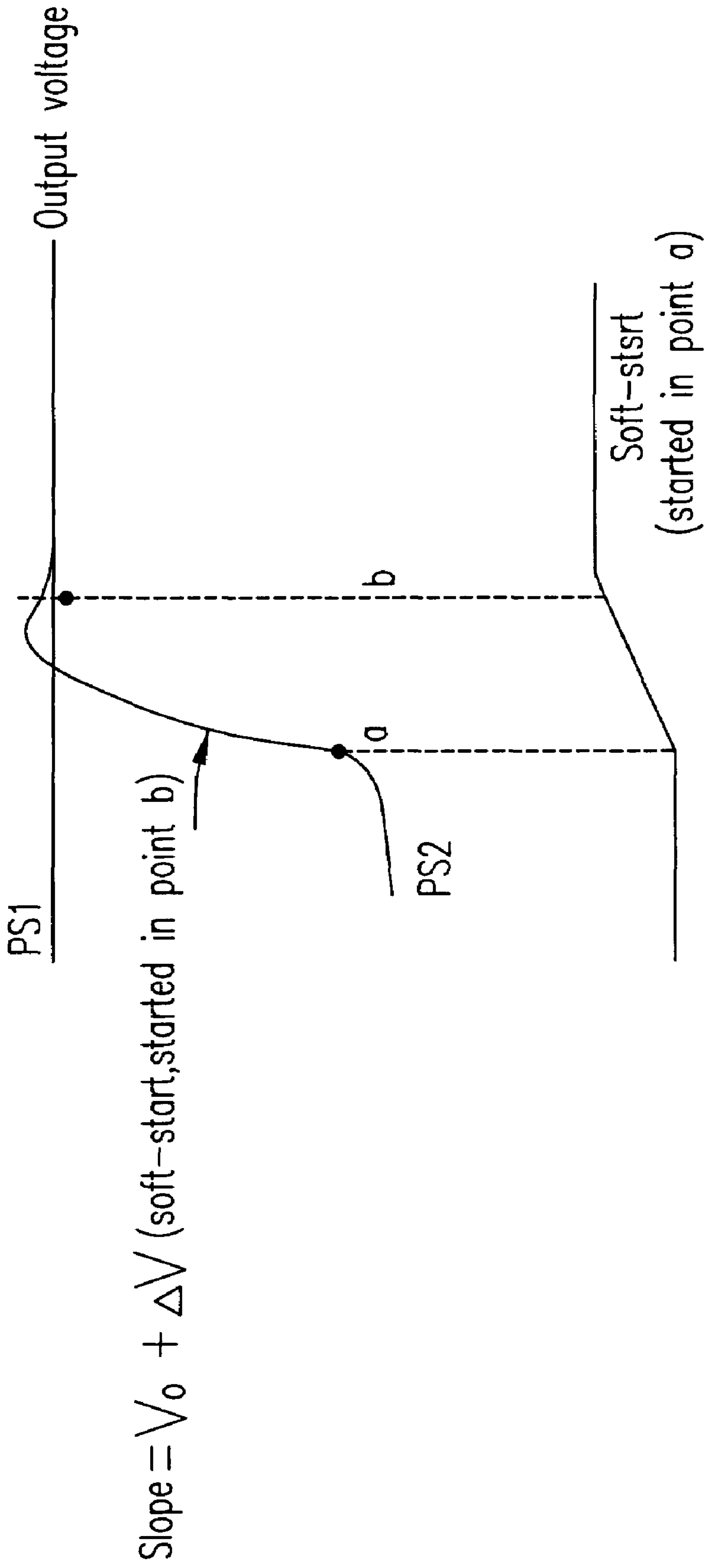

Please refer to FIG. 2(*a*) showing a master-slave current distribution circuit according to a preferred embodiment of the present invention, wherein the master-slave current distribution circuit 2 is applied in the parallel power supplies including the first power supply PS1 and the second power supply PS2 which are connected in parallel. The master-slave current distribution circuit 2 includes a voltage amplifier 21, a negative feedback circuit provided by an impedor 22, a power converting unit 23, a current detecting unit 24, an equivalent diode 25, an adjustable amplifier 26, an adding unit 27 and an energy gap voltage modulating unit 28.

In the master-slave current distribution circuit 2, the input of the power converting unit 23 is electrically connected to an output of the voltage amplifier 21, and the output of the power converting unit 23 is electrically connected to a load. The input of the current detecting unit 24 is electrically connected to the output of a power converting unit 23 and the load. The input of the equivalent diode 25 is electrically connected to the output of the current detecting unit 24, and the output of the equivalent diode 25 is electrically connected to the first power supply PS1 and the second power supply PS2. The inverting input of the adjustable amplifier 26 is electrically connected to the output of the current detecting unit 24 and the input of the equivalent diode 25. The non-inverting input of the adjustable amplifier 26 is electrically connected to the output of the equivalent diode 25 and the first power supply PS1 and the second power supply PS2. The adding unit 27 is electrically connected to the non-inverting input of the voltage amplifier 21 and the output of the adjustable amplifier 26. The energy gap voltage modulating unit 28 is electrically connecting to the output of the current detecting unit 24 and the non-inverting output of the adjustable amplifier 26.

The energy gap voltage modulating unit 28 is used to modulate the energy gap voltage between the output of the current detecting unit 24 and the non-inverting input of the adjustable amplifier 26. Please refer to FIG. 2(*b*), the principle adopted in the modulation is that increasing the energy gap voltage when the load is lower than the predetermined value and decreasing the energy gap voltage when the load is higher than the predetermined value. Therefore, the problem on the unstability of the master-slave current distribution circuit when the first power supply PS1 is parallelly electrically connected to the second power supply PS2 under the light load is improved and the problem on the parallel error generated therebetween in the heavy load is decreased. It is apparent that the parallel error is dramatically improved as shown in FIG. 2(*c*).

Please refer to FIG. 3(*a*), this is a graph illustrating the master-slave current distribution circuit according to another preferred embodiment of the present invention. The master-slave current distribution circuit 3 includes a voltage amplifier 31, an impedor 32, a power converting unit 33, an equivalent diode 35, an adjustable amplifier 36, an adding unit 37, and an energy gap voltage modulating unit 38. Furthermore, the master-slave current distribution circuit 3 is able to selectively includes each of the active droop unit 391 and the soft-start circuit 392 or includes both of them.

The active droop unit 391 is electrically connected to the output of the current detecting unit 34. Please refer to FIG. 3(*b*), the principle adopted in the modulation is linear adjusting the operating voltage in the master-slave current distribution circuit 3 when the load is lower a the predetermined value (in a light load). The predetermined value is 1%~5% of the max value of the output voltage from the master-slave current distribution circuit 3. After adjusting, the operation linear slope of the current distribution 3 is equaling to $\Delta V/(I_0*B)$, wherein $\Delta V$ is equaling to $(V_0*A)$, $I_0$ and $V_0$ are respective the output current and voltage of the master-slave current distribution circuit 3, and A and B are proportional values which are in ranges of 1%~5% and 5%~10%, respectively. This is a suggested linear operation ratio, and $\Delta V$ is an applied voltage range of the master-slave current distribution circuit 3. Since such a modulation method is able to achieve a well operational linearity and a high accuracy of the master-slave current distribution circuit 3, the master-slave current distribution circuit 3 is able to reduce an error generated from the power supply PS1 and the power supply PS2 which are electrically connected under a light load.

Furthermore, the soft-start circuit 392 is electrically connected to the voltage amplifier 31 and the adjustable amplifier 36. The output voltage of the load from the master-slave current distribution circuit 3 is fedback to the soft-start circuit 392. The start point of the soft-start circuit 392 is set on the point b referring to FIG. 3(*b*) and the output voltage is syhchronized to the 90% of the output voltage, which is the predetermined ratio value. The surge voltage of the first power supply PS1 resulting from the power supply PS2 being hot-plugged into the parallel supply while in operation is decreased.

According to the graph of FIG. 3(*d*), when the start point of the soft-start circuit 392 is set on point b and the voltage is syhchronized to the 90~95% of the output voltage, the surge voltage of the output voltage in the power supply PS1 and the power supply PS2 is decreased effectively. Therefore, the use of soft-start circuit 392 could solve the problem of the overshot surge voltage of the first power supply PS1 resulting from the power supply PS2 being hot-plugged into the parallel supply while in operation. The use of the soft-start circuit 392 also overcomes the drawback of the un-complete performance of the conventional master-slave current distribution circuit, and the problem of a few surges being still generated therein, those are shown in FIG. 3(*f*).

Figure 4:
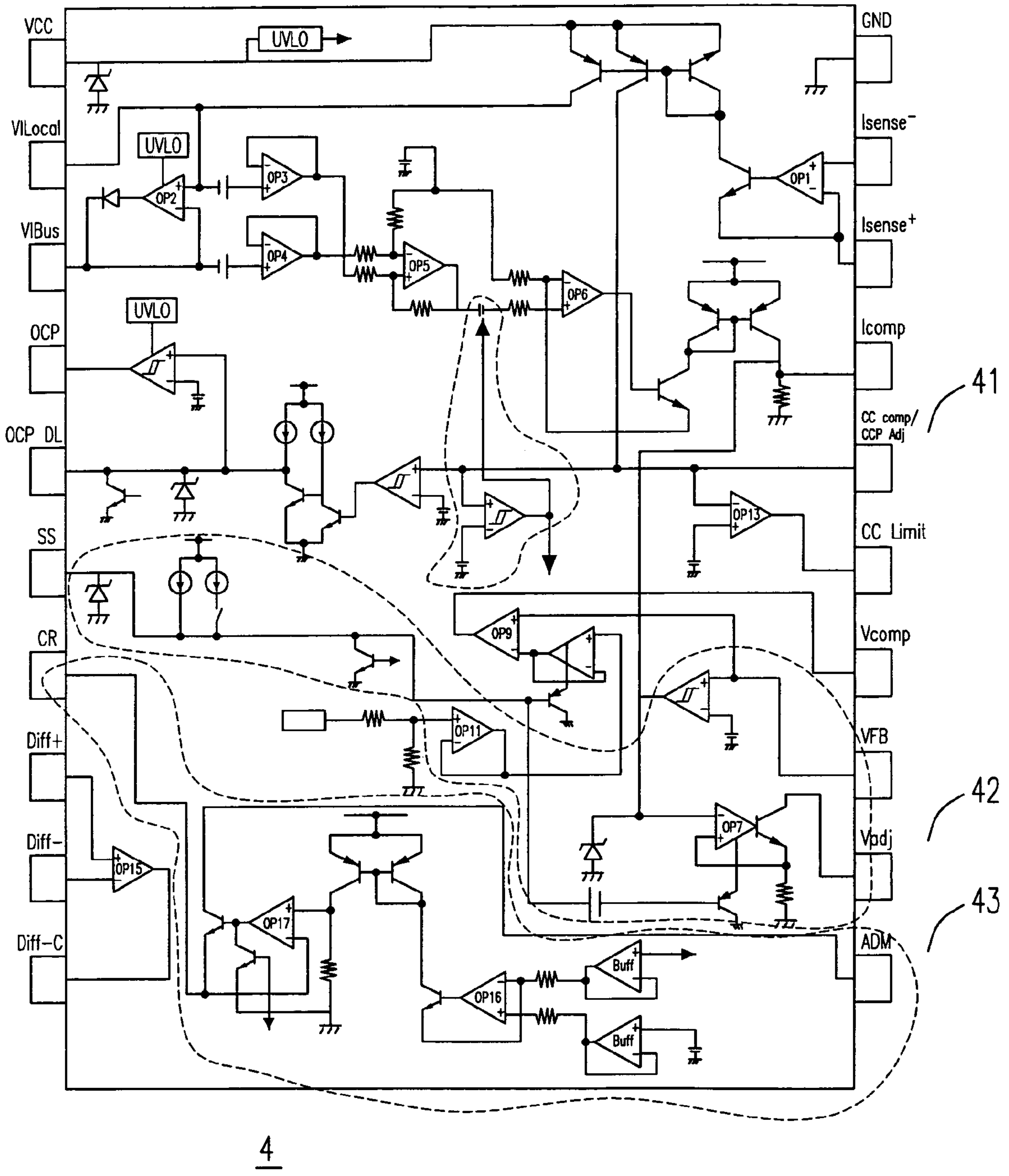
FIG. 4 is a diagram illustrating a master-slave current distribution circuit for parallel power supplies according to another preferred embodiment of the present invention.

Please refer to FIG. 4, this is a graph of a master-slave current distribution circuit according to another preferred embodiment of the present invention. The energy gap voltage modulating unit 41 in the master-slave current distribution circuit 4 is selectively electrically connected to the active droop unit 43 or the soft-start circuit 42 or connected to both units in order to stabilize the parallel system of the power supplies PS1 and PS2.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A master-slave current distribution circuit for parallel power supplies, wherein said parallel power supplies comprise at least a first power supply and a second power supply, comprising:
- a voltage amplifier;
- a power converting unit having an input electrically connected to an output of said voltage amplifier, and having an output electrically connected to a load;
- a current detecting unit having an input electrically connected to said output of said power converting unit and said load;
- an equivalent diode having an input electrically connected to an output of said current detecting unit, and having an output electrically connected to said parallel power supplies;
- an adjustable amplifier having an inverting input electrically connected to said output of said current detecting unit and said input of said equivalent diode, and having a non-inverting input electrically connected to said output of said equivalent diode and said parallel connecting power supplies;
- an adding unit electrically connected to a non-inverting input of said voltage amplifier and an output of said adjustable amplifier; and
- an energy gap voltage modulating unit electrically connected between said output of said current detecting unit and said non-inverting input of said adjustable amplifier,
- wherein an energy gap voltage formed between said output of said current detecting unit and said non-inverting input of said adjustable amplifier is modulated by said energy gap voltage modulating unit so that an unstability formed from said first power supply and said second power supply under a light load is eliminated.

2. The master-slave current distribution circuit as claimed in claim 1, wherein said master-slave current distribution circuit is a master-slave circuit.

3. The master-slave current distribution circuit as claimed in claim 1, wherein said voltage amplifier comprises a negative feedback circuit.

4. The master-slave current distribution circuit as claimed in claim 3, wherein said negative feedback circuit comprises an impedance.

5. The master-slave current distribution circuit as claimed in claim 1, wherein said energy gap voltage is raised by said energy gap voltage modulating unit when a first value of said load is less than a predetermined value, and is lowered by said energy gap voltage modulating unit when a second value of said load is more than said predetermined value.

6. The master-slave current distribution circuit as claimed in claim 5, wherein said output of said current detecting unit is electrically connected to an active droop unit.

7. The master-slave current distribution circuit as claimed in claim 6, wherein said reference value of an operating voltage of said master-slave current distribution circuit is linearly adjusted by said active droop unit when a value of said load is less than said predetermined value so as to eliminate an error, which is formed when said first power supply is electrically connected to said second power supply in parallel.

8. The master-slave current distribution circuit as claimed in claim 7, wherein said reference value of said operating voltage is 1%~5% of an output voltage of said master-slave current distribution circuit.

9. The master-slave current distribution circuit as claimed in claim 1, wherein said voltage amplifier and said adjustable amplifier are electrically connected to a soft-start circuit.

10. The master-slave current distribution circuit as claimed in claim 9, wherein said output voltage output from said master-slave current distribution circuit to said load is fed back to said soft-start circuit, so that said soft-start circuit is driven and has a voltage, and when a value of said voltage is equal to a proportional value of said output voltage, a surge voltage of said output voltage is lowered.

11. The master-slave current distribution circuit as claimed in claim 10, wherein said proportional value is 90%~95% of said output voltage.

12. A master-slave current distribution circuit for parallel power supplies, wherein said parallel power supplies comprise at least a first power supply and a second power supply, comprising:

a power converting unit having an output electrically connected to a load;

a current detecting unit having an input electrically connected to said output of said power converting unit and said load;

an equivalent diode having an input electrically connected to an output of said current detecting unit, and having an output electrically connected to said parallel power supplies;

an adjustable amplifier having an inverting input electrically connected to said output of said current detecting unit and said input of said equivalent diode, and having a non-inverting input electrically connected to said output of said equivalent diode and said parallel connecting power supplies; and an energy gap voltage modulating unit electrically connected between said output of said current detecting unit and said non-inverting input of said adjustable amplifier;

wherein an energy gap voltage formed between said output of said current detecting unit and said non-inverting input of said adjustable amplifier is modulated by said energy gap voltage modulating unit in order to eliminate an unstability formed from said first power supply and said second power supply under a light load.

13. The master-slave current distribution circuit as claimed in claim 12, wherein said master-slave current distribution circuit is a master-slave circuit.

14. The master-slave current distribution circuit as claimed in claim 12, wherein said energy gap voltage is raised by said energy gap voltage modulating unit when a first value of said load is less than a predetermined value, and is lowered by said energy gap voltage modulating unit when a second value of said load is more than said predetermined value.

15. The master-slave current distribution circuit as claimed in claim 14, wherein said output of said current detecting unit is electrically connected to an active droop unit.

16. The master-slave current distribution circuit as claimed in claim 15, wherein a reference value of an operating voltage of said master-slave current distribution circuit is linearly adjusted by said active droop unit when a value of said load is less than said predetermined value in order to eliminate an error, which is formed when said first power supply is electrically connected to said second power supply in parallel.

17. The master-slave current distribution circuit as claimed in claim 16, wherein a reference value of said operating voltage is 1%~5% of an output voltage of said master-slave current distribution circuit.

18. A master-slave current distribution circuit for parallel power supplies, wherein said parallel power supplies comprise at least a first power supply and a second power supply, comprising:

a current detecting unit electrically connected to a load;

an adjustable amplifier having an inverting input electrically connected to an output of said current detecting unit and said parallel connecting power supplies; and an energy gap voltage modulating unit electrically connected between said output of said current detecting unit and an non-inverting input of said adjustable amplifier;

wherein an energy gap voltage formed between said output of said current detecting unit and said non-inverting input of said adjustable amplifier is modulated by said energy gap voltage modulating unit in order to eliminate an unstability formed from said first power supply and said second power supply under a light load.

19. The master-slave current distribution circuit as claimed in claim 18, wherein said master-slave current distribution circuit is a master-slave circuit.

* * * * *